(12) United States Patent
Ing et al.

(10) Patent No.: US 10,727,680 B2
(45) Date of Patent: *Jul. 28, 2020

(54) POWER SYSTEMS AND METHODS FOR ELECTRIC VEHICLES

(71) Applicant: NIO USA, Inc., San Jose, CA (US)

(72) Inventors: Adam H Ing, Santa Clara, CA (US); Alexander J Smith, White Lake, MI (US)

(73) Assignee: NIO USA, Inc., San Jose, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 15/712,532

(22) Filed: Sep. 22, 2017

(65) Prior Publication Data
US 2019/0097436 A1 Mar. 28, 2019

(51) Int. Cl.
*H02J 7/00* (2006.01)
*H01M 10/44* (2006.01)
*B60L 53/30* (2019.01)

(52) U.S. Cl.
CPC ............ *H02J 7/0024* (2013.01); *B60L 53/30* (2019.02); *H01M 10/44* (2013.01); *H02J 7/0068* (2013.01); *H01M 2220/20* (2013.01)

(58) Field of Classification Search
CPC .......................... B60L 11/1868; H02J 7/0024
USPC ........................................................ 320/109
See application file for complete search history.

(56) References Cited

U.S. PATENT DOCUMENTS

| | | | |
|---|---|---|---|
| 5,602,459 A | 2/1997 | Rogers | |
| 5,995,380 A * | 11/1999 | Maue | B60R 16/0238 174/254 |
| 8,129,952 B2 | 3/2012 | Lee | |
| 8,670,888 B1 * | 3/2014 | Brenner | B60L 15/2045 701/22 |
| 10,076,971 B2 | 9/2018 | Huang et al. | |
| 2009/0212626 A1 * | 8/2009 | Snyder | B60K 6/448 307/10.1 |
| 2010/0065349 A1 | 3/2010 | Ichikawa et al. | |
| 2012/0007557 A1 | 1/2012 | Hayashigawa | |
| 2015/0183328 A1 * | 7/2015 | Kusch | B60L 58/26 320/109 |
| 2016/0352131 A1 | 12/2016 | Nelson | |
| 2017/0012324 A1 | 1/2017 | Giordano et al. | |
| 2017/0141368 A1 | 5/2017 | Ricci | |
| 2017/0225588 A1 | 8/2017 | Newman | |
| 2017/0305291 A1 | 10/2017 | Koh et al. | |
| 2019/0100111 A1 * | 4/2019 | Liu | B60L 50/50 |

(Continued)

OTHER PUBLICATIONS

Notice of Allowance for U.S. Appl. No. 15/654,953, dated May 23, 2019 5 pages.

(Continued)

*Primary Examiner* — Yalkew Fantu
(74) *Attorney, Agent, or Firm* — Sheridan Ross P.C.

(57) ABSTRACT

Embodiments include a junction box for an electric vehicle. The junction box includes a charging port to receive power from an external power source, and a plurality of switching elements to control electrical connections between the charging port, a first battery, and a second battery. On/off states of the plurality of switching elements control whether the charging port, the first battery and the second battery are connected in a first configuration or a second configuration.

20 Claims, 14 Drawing Sheets

(56) References Cited

U.S. PATENT DOCUMENTS

2020/0023794 A1    1/2020   Maekawa

OTHER PUBLICATIONS

Notice of Allowance for U.S. Appl. No. 15/654,583, dated May 22, 2019 5 pages.
Official Action for U.S. Appl. No. 15/654,953, dated Feb. 7, 2019 6 pages.
Official Action for U.S. Appl. No. 15/654,583, dated Feb. 7, 2019 6 pages.
U.S. Appl. No. 15/654,583, filed Jul. 19, 2017, Chen et al.
U.S. Appl. No. 15/654,953, filed Jul. 20, 2017, Ing et al.
U.S. Appl. No. 15/721,428, filed Sep. 29, 2017, Liu et al.
Diebig et al., "Optimizing Multi-Voltage Automotive Power Supply Systems Using Electro-Thermal Simulation," EEHE, 2014, retrieved from http://www.bordsysteme.tu-dortmund.de/publications/2014_EEHE_Diebig_optimizing_multi_voltage_automotive_power_supply_systems_using_electro_thermal_simulation.pdf, 16 pages.
Official Action for U.S. Appl. No. 15/721,428, dated Oct. 31, 2019 14 pages.
Notice of Allowance for U.S. Appl. No. 15/721,428, dated Feb. 14, 2020, 10 pages.

\* cited by examiner

| # | Control Sequence Action | Controller Device | Trigger Logic Diagnostics | Description Comments |
|---|---|---|---|---|
| 1 | Close R- | HVC R | Coil Drive Current/Voltage (R-) = ON | Connect Battery R Ground to Vehicle |
| 2 | Close C- | HVC L | Coil Drive Current/Voltage (C-) = ON | Connects Ground to DCFC and 800/400V DCDC |
| 3 | Close L- | HVC L and HVC R | (V2 to V5) = (V4 to V5) (±2%) And Coil Current/Voltage (L-) = PM | Diagnostic Check L- (Not Required) |
| 4 | Open L- | HVC L and HVC R | (V2 to V5) = Open Line And Coil Current/Voltage (L-) = 0 | Diagnostic Check L- (Not Required) |
| 5 | Close L+ PC | HVC L | (V4 to V1) = (V4 to V5) (±2%) And Coil Current/Voltage (L+) = PM | Diagnostic Check L+ PC (Not Required) |
| 6 | Open L+ PC | HVC L | (V4 to V1) = Open Line and Coil Current/Voltage (L+) = 0 | Diagnostic Check L+ PC (Not Required) |
| 7 | Close L+ | HVC L | (V4 to V1) = (V4 to V5) (±2%) And Coil Current/Voltage (L+) = PM | Diagnostic Check L+ (Not Required) |
| 8 | Open L+ | HVC L | (V4 to V1) = Open Line and Coil Current/Voltage (L+) = 0 | Diagnostic Check L+ (Not Required) |
| 9 | Close R+ PC to 50V | HVC R | 5V < (V2 to V1) < 60V Coil drive current/voltage (R+ PC) | Stage 1 Pre-Charge for open line detection (Not Required) |
| 10 | Open R+ PC | HVC R and VCU | HV devices report bus voltage to VCU | Disconnect PC to limit voltage rise and let voltage decay during open line detection (Not Required) |

CONTINUED FROM FIG.9B

| | | | | |
|---|---|---|---|---|
| 11 | Close R+ PC | HVC R | (V2 to V1) = 0.97*(V2 to V3) within 250 ms And coil current/voltage (R+ PC) | Pre-Charge 400V bus to Battery R Voltage |
| 12 | Close R+ | HVC R | (V2 to V3) = (V2 to V1) (±2%) And coil current/voltage (R+) | Main connection for battery R to 400V bus |
| 13 | Open R+ PC | HVC R | Open after 250 ms and verify with coil current/voltage (R+ PC) | Open R+ PC to finish battery R connection |
| 14 | Close SP | HVC R | (V2 to V3) = (V2 to V4) (±2%) And coil current/voltage (SP) | Enable 800V Pack Mode |
| 15 | PC DCFC Station | VCU→OBC OBC→DCFC Station | (V2 to V5) = 0.97(V2 to V6) And -(V4 to V7)+(V4 to V5) = 0.97[-(V4 to V7)+(V4 to V6)] | DCFC station raises voltage to match battery. Both HVCs make sure DCFC voltage matches Pack Voltage |
| 16 | Close C+ | HVC L | (V2 to V6) = (V2 to V5)(±2%) And coil current/voltage (C+) | DCFC Contacts are now live for the DCFC station to read voltage |
| 17 | Enable 800/400V DCDC | HVC L | 400V Output > 0 A or [(V2 to V3 = V4 to V5)(±2%)] | Start operation of 800/400V DCDC to begin pack balancing and supporting 400V loads |
| 18 | Enable 400V Loads | VCU | 400 V Output > 0 A, 800V input >0A | Start operation of 400V loads |
| 19 | Enable Fast Charging | OBC→DCFC Station | HVC 1 Current + 800V/400V DCDC Current = DCFC Current Request (±2%) | DCFC station begins charging |

FIG.9C

| CONTROL SEQUENCE | | CONTROLLER |
|---|---|---|
| # | ACTION | DEVICE |
| 1 | DISABLE FAST CHARGING | OBC →DCFC STATION |
| 2 | DISABLE 400V LOADS | VCU |
| 3 | DISABLE 800/400V DCDC | HVC L |
| 4 | OPEN C+ | HVC L |
| 5 | OPEN C- | HVC L |
| 6 | OPEN SP | HVC L |
| 7 | OPEN R+ | HVC R |
| 8 | OPEN R- | HVC R |

FIG.9D

POWER SYSTEMS AND METHODS FOR ELECTRIC VEHICLES

FIELD

The present disclosure is generally directed to vehicle systems, and more particularly to vehicle power systems.

BACKGROUND

Most vehicles, in particular electric and hybrid vehicles, include power systems usually referred to as battery management systems (BMSs) that monitor and control the operation of the batteries within the vehicles. For example, the BMS of an electric vehicle controls the vehicle's powertrain as well as auxiliary components or features, such as heating and cooling components, dashboard electronics, etc. As the industry continues to develop, additional/alternative power systems are desired.

BRIEF DESCRIPTION OF THE DRAWINGS

FIGS. 9B-9D illustrate control sequences for the schematic of FIG. 9A in accordance with at least one example embodiment;

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
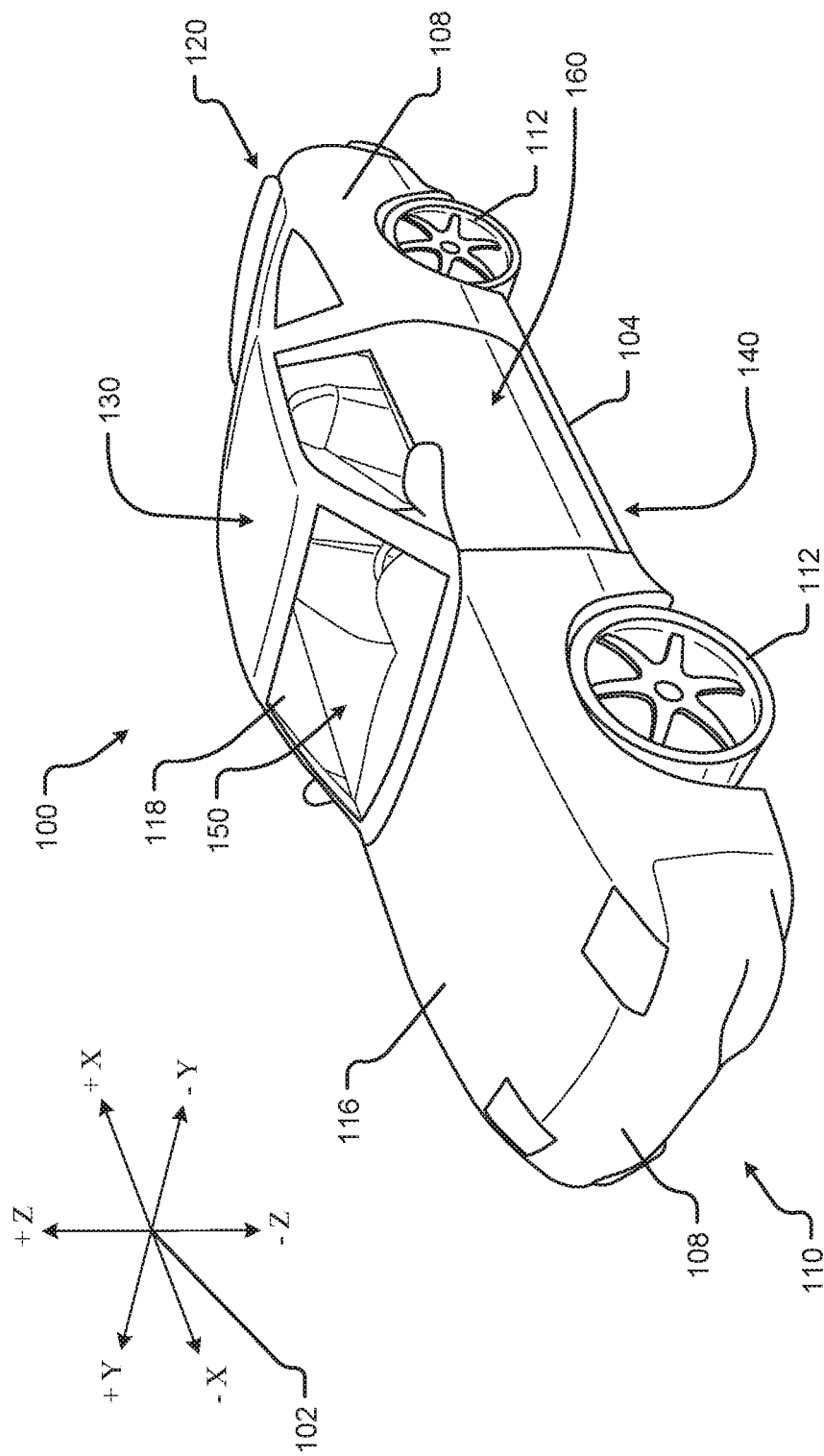
FIG. 1 shows a perspective view of a vehicle (or electric vehicle) in accordance with at least one example embodiment.

FIG. 1 shows a perspective view of a vehicle (or electric vehicle) 100 in accordance with example embodiments. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, a battery electric vehicle (BEV) or a hybrid electric vehicle (HEV). Where the vehicle 100 is BEV, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is an HEV, the vehicle 100 may comprise the above described elements of a BEV with the addition of a gas-powered (or diesel-powered) engine and associated components in the front compartment (under the vehicle hood 116), which engine may be configured to drive either or both of the front wheels 112 and the rear wheels 112. In some embodiments where the vehicle 100 is an HEV, the gas-powered engine and associated components may be located in a rear compartment of the vehicle 100, leaving the front compartment available for storage or trunk space or for other uses. In some embodiments, the vehicle 100 may be, in addition to a BEV and an HEV, a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

The vehicle 100 may be capable of autonomous operation, wherein one or more processors receive information from various sensors around the vehicle and use that information to control the speed and direction of the vehicle 100 so as to avoid hitting obstacles and to navigate safely from an origin to a destination. In such embodiments, a steering wheel is unnecessary, as the one or more processors, rather than a vehicle occupant, control the steering of the vehicle 100.

Figure 2:
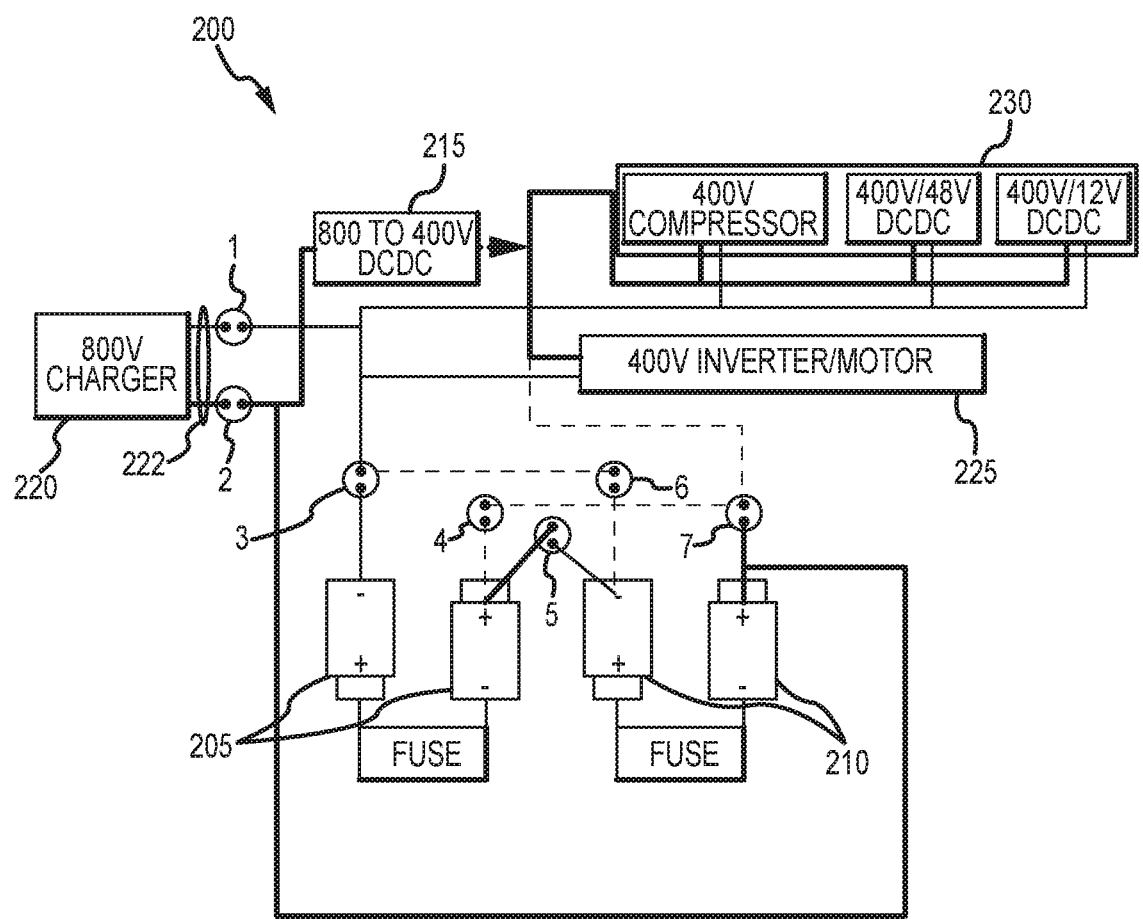
FIG. 2 is an example schematic of a power system and connections for a charging mode of the electric vehicle in accordance with at least one example embodiment.

FIG. 2 is an example schematic of a power system 200 for the electric vehicle 100 in accordance with at least one example embodiment. The power system 200 controls the overall operation of electric motor(s) and other components within the vehicle 100.

As shown in FIG. 2, the system 200 includes a first battery 205, a second battery 210, a voltage converter 215 (e.g., 10-20 kW), an external power source (or charger) 220, a powertrain 225 (including an inverter and an electric motor), auxiliary components 230 (including a 400V compressor, a 400V/48V DCDC and/or a 400V/12V DCDC) and a plurality of switching elements (also referred to as switches or contactors) 1 to 7 (e.g., rated at 500 A each).

The voltage converter 215 converts a first voltage (e.g., 800V) to a second voltage (e.g., 400V) that is less than the first voltage to power the auxiliary components 230, for example, while the vehicle 100 is charging during a charging mode. The voltage converter 215 may be a direct current (DC) to direct current converter (DCDC).

The powertrain 225 is coupled to the voltage converter 215, the first battery 205, and the second battery 210 so that the first battery 205 and the second battery 210 provide the second voltage (e.g., 400V) to the powertrain 225 to power the electric vehicle 100 with the second voltage while the vehicle 100 is operating in a driving mode.

Figure 10:
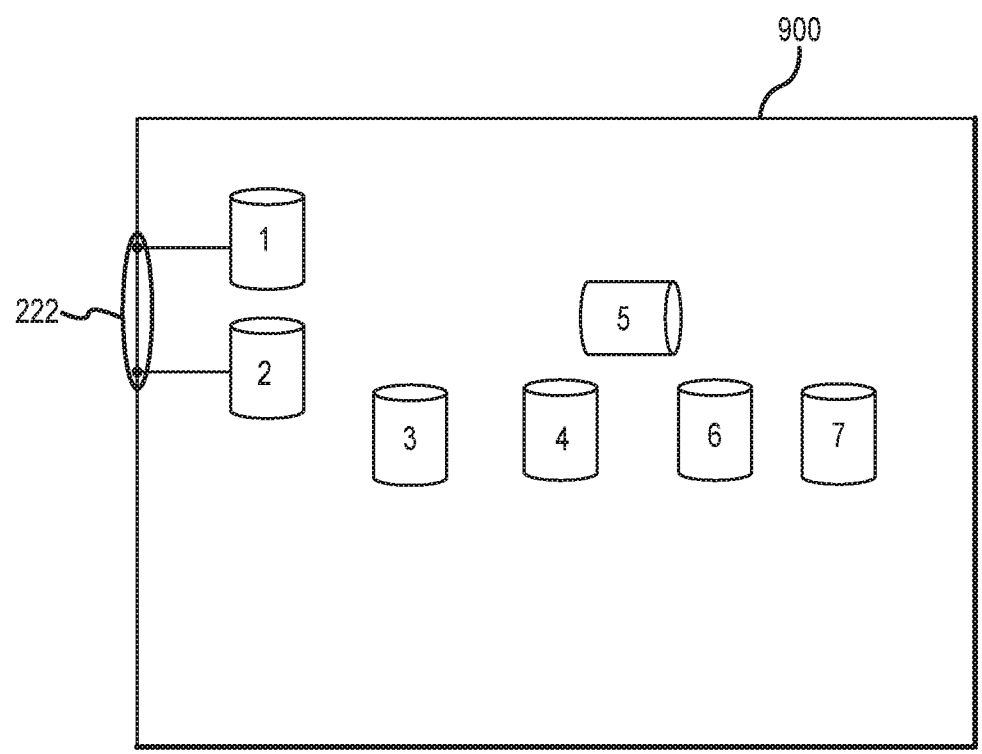
FIG. 10 illustrates an example structure and arrangement of the plurality of switching elements within a junction box in accordance with at least one example embodiment.

The plurality of switching elements 1 to 7 are part of a junction box in the electric vehicle 100, where switches 1 and 2 form a charging port 222 to receive power from an external power source 220 (see FIG. 10 for example of a junction box). The plurality of switching elements 1 to 7 control electrical connections between the charging port 222, the first battery 205, and the second battery 210. For example, on/off states of the plurality of switching elements 1 to 7 control whether the charging port 222, the first battery 205 and the second battery 210 are connected in a first configuration or a second configuration.

The system 200 includes at least one controller (see FIG. 8 for examples of a controller) that controls switching of the plurality of switching elements 1 to 7 to connect the first battery 205 and the second battery 210 in either the first configuration or the second configuration according to an operation mode of the electric vehicle 100. For example, when the operation mode is a charging mode, the at least one controller controls the plurality of switching elements 1 to 7 to connect the first battery 205 and the second battery 210 in the first configuration. Further, when the operation mode is a driving mode, the at least one controller controls the plurality of switching elements 1 to 7 to connect the first battery 205 and the second battery 210 in the second configuration. According to at least one example embodiment, the first configuration is the first battery 205 and the second battery 210 being connected in series, and the second configuration is the first battery 205 and the second battery 210 being connected in parallel.

FIG. 2 further illustrates that the first and second batteries 205 and 210 may each include a fuse. However, the fuse may be omitted if desired. It should be further understood that the first battery 205 and the second battery 210 may be separate battery packs or a single battery pack tapped at locations that effectively split the single battery pack into two batteries. shows the first and second batteries 205/210 as having two battery elements each, it should be understood that According to at least one example embodiment, the plurality of switching elements 1 to 7 are electromagnetic switches that each include a plunger movable between a first position and a second position based on an applied electromagnetic field (see FIGS. 6 and 7). As shown in FIG. 2, a first pair of electromagnetic switches 1 and 2 are coupled to the charging port 222. A second pair of electromagnetic switches 3 and 4 are coupled to the first battery 205. A third pair of electromagnetic switches 6 and 7 are coupled to the second battery 210. A mode switching element 5 is coupled between the first battery 205 and the second battery 210.

Each of the first pair of electromagnetic switches 1 and 2, the second pair of electromagnetic switches 3 and 5, and the third pair of electromagnetic switches 6 and 7 includes i) a first electromagnetic switch coupled to negative terminals of one or more of the charging port 222, the first battery 205, and the second battery 210, and ii) a second electromagnetic switch coupled to positive terminals of one or more of the charging port 222, the first battery 205, and the second battery 210. For example, the first electromagnetic switch of each of the first pair, the second pair, and the third pair are coupled to one another. The second electromagnetic switch of each of the first pair, the second pair, the third pair are coupled to one another. For example, in FIG. 2, switches 1, 3, and 6 are coupled to one another and control connections to negative terminals of the charging port 222, the first battery 205, and the second battery 210. Meanwhile, switches 2, 4, and 7 are coupled to one another and control connections to positive terminals of the charging port 222, the first battery 205, and the second battery 210.

As shown in FIG. 2, the mode switching element 5 includes a first terminal coupled to a positive terminal of the first battery 205, and a second terminal coupled to a negative terminal of the second battery 210. The mode switching element is ON during a charging mode and OFF during a driving mode.

FIG. 2 illustrates connections for a charging mode of the electric vehicle 100, where the first and second batteries 205/210 are connected in series by turning ON switches 1, 2, 3, and 5 and turning OFF switches 4, 6, and 7. The connections between various elements in FIG. 2 (and subsequent figures) are illustrated by solid lines and dashed lines, where the solid lines indicate an active electrical connection between elements and the dashed lines indicate an inactive electrical connection between elements. The charging mode may be considered a fast charging mode because the batteries 205/210, which provide power to the powertrain 225 at 400V during the driving mode, are charged by the 800V external power source 220 during the charging mode.

Figure 3:
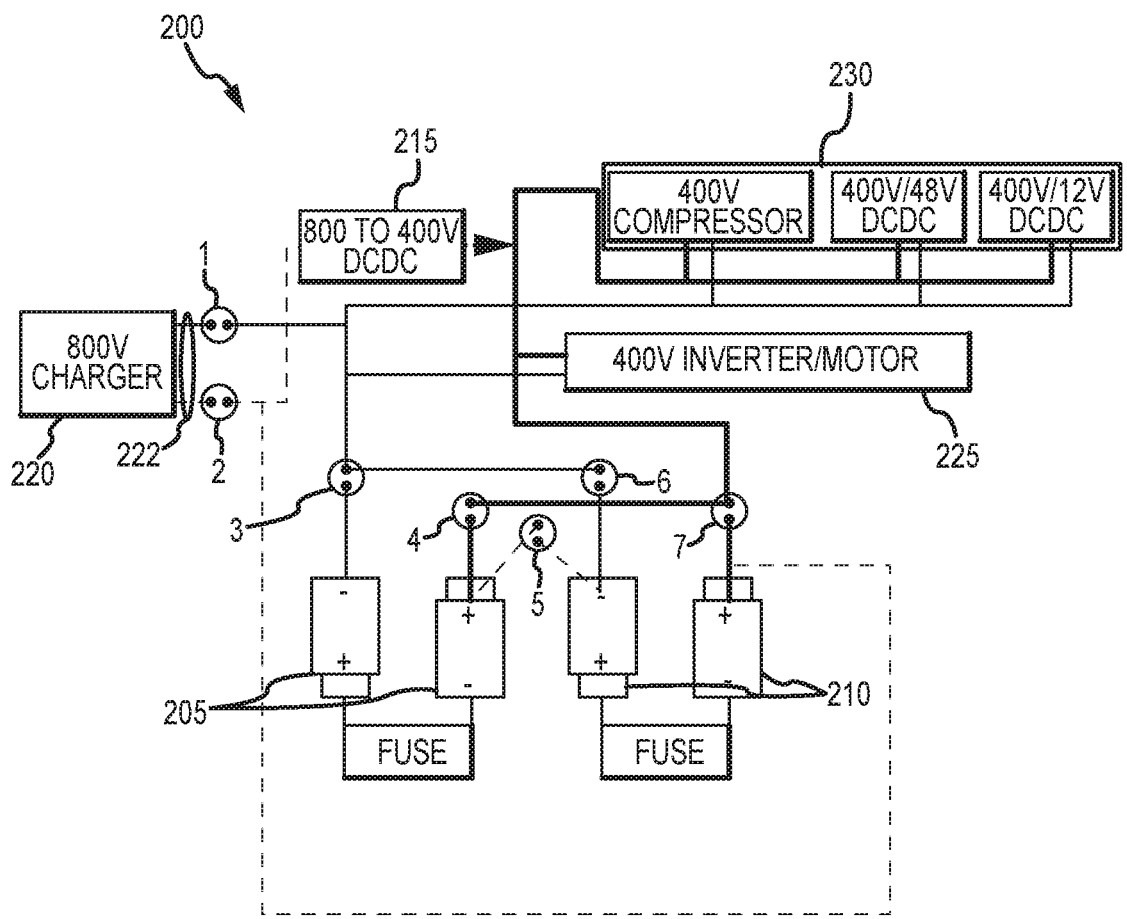
FIG. 3 illustrates connections of a power system for a driving mode of the electric vehicle in accordance with at least one example embodiment.

FIG. 3 illustrates connections of the system 200 for a driving mode of the electric vehicle 100. As shown in FIG. 3, the first and second batteries 205/210 are connected in parallel by turning OFF switches 2 and 5 and turning ON switches 3, 4, 6, and 7. Now, the vehicle 100 is disconnected from the external power source 220, and the batteries 205 and 210 provide 400V of power to the powertrain 225 and the auxiliary components 230.

Figure 4:
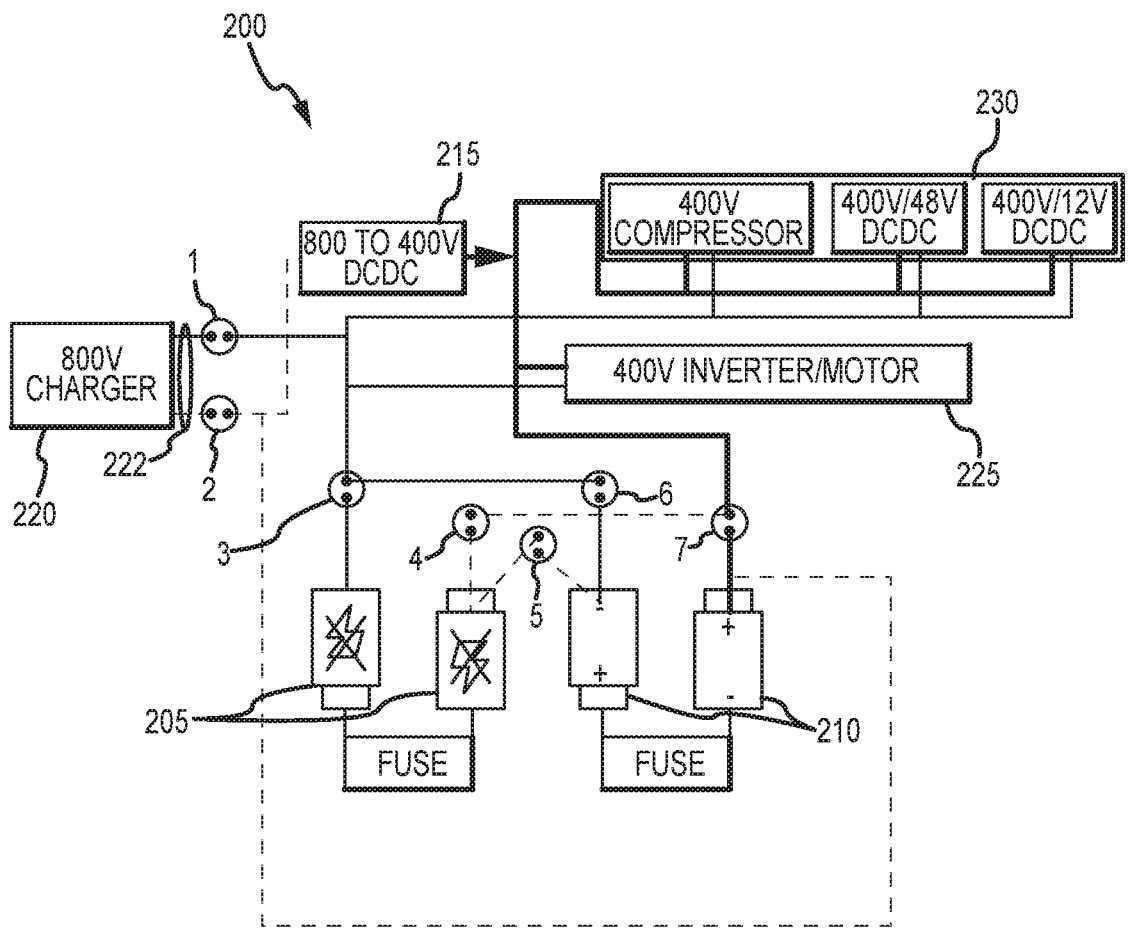
FIG. 4 illustrates connections of the system upon failure of one of the batteries during the driving mode in accordance with at least one example embodiment.

FIG. 4 illustrates connections of the system 200 upon failure of one of the batteries 205/210 during the driving mode. In particular, FIG. 4 illustrates connections of the plurality of switching elements 1 to 7 when the first battery 205 fails. In case of such a failure, switches 2, 4, and 5 are turned OFF and switches 1, 3, 6, and 7 are turned ON. This removes the first battery 205 from the system and connects the second battery 210 to the powertrain 225 and the auxiliary components 230 so that the vehicle 100 is still drivable.

Figure 5:
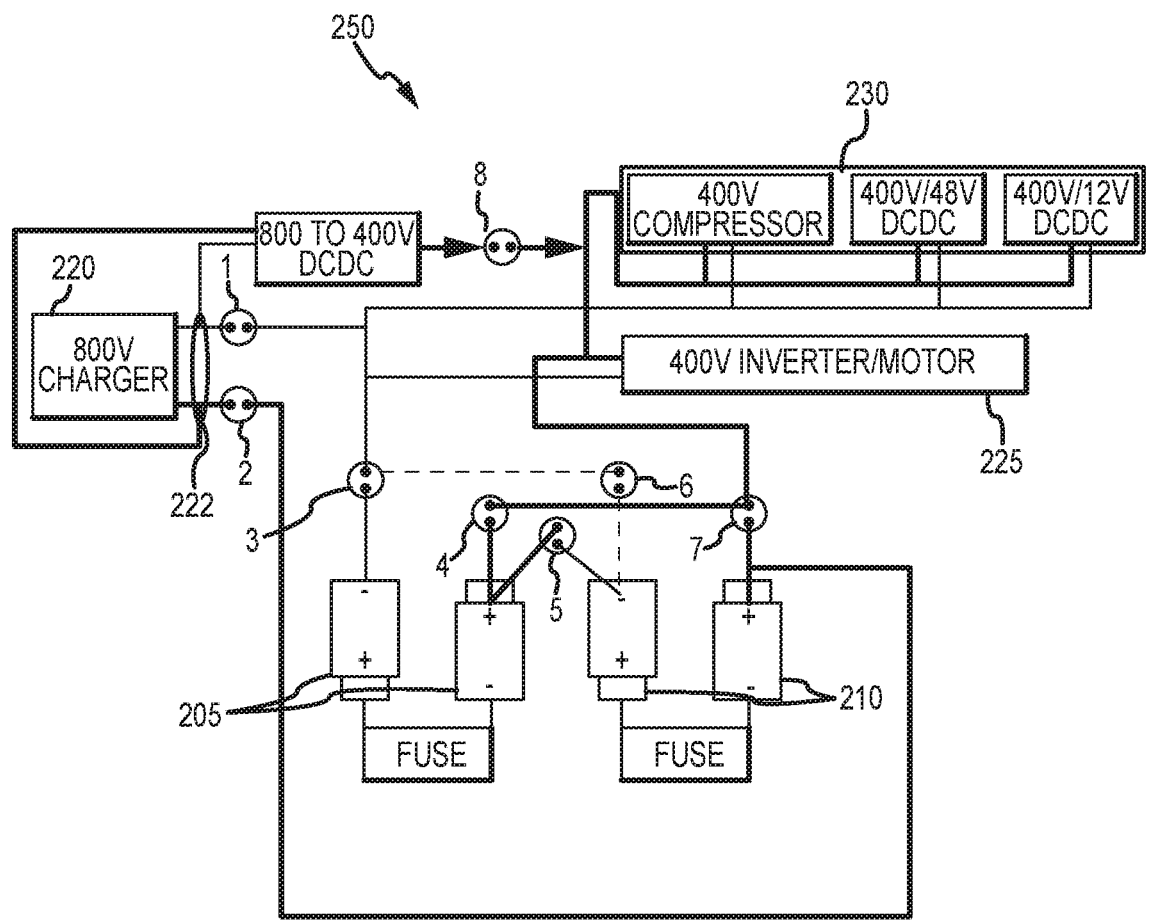
FIG. 5 is another example schematic of a power system and connections for a charging mode of the electric vehicle in accordance with at least one example embodiment.

FIG. 5 is another example schematic of a power system 250 and connections for a charging mode of the electric vehicle 100 in accordance with at least one example embodiment.

As shown in FIG. 5, the system 250 includes a plurality of switching elements 1 to 8 that connect the first battery 205 and the second battery 210 in series during the charging mode. Here, switching element 8 may have a lower current tolerance than switching elements 1 to 7 and is coupled between the voltage converter 215 and the powertrain/auxiliary components 225/230. Switching element 8 serves to isolate the batteries 205/210 from the external power source 220 in the event of a failure of the voltage converter 215. In the arrangement shown in FIG. 5, the first battery 205 powers the powertrain/auxiliary components 225/230 during charging. That is, the voltage converter 215 is used to charge the first battery 205, which allows the first battery 205 to be balanced by the voltage converter 215. In addition, the first battery 205 serves as a power buffer for the auxiliary components 225. The switching elements 1 to 8 are then controlled to connect the batteries 205/210 in parallel for the driving mode (similar to or the same as in FIG. 3).

Figure 6:
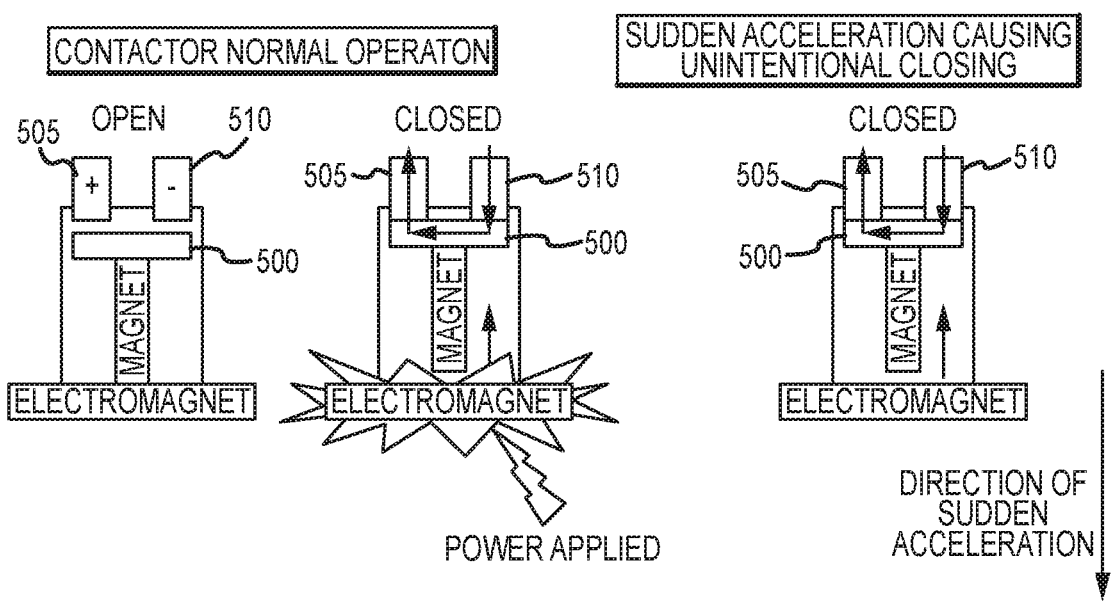
FIG. 6 illustrates an example structure of one of the plurality of switching elements in accordance with at least one example embodiment.

FIG. 6 illustrates an example structure of one of the plurality of switching elements 1 to 7. As shown in FIG. 6, the plurality of switching elements 1 to 7 may be electromagnetic switches that each include a plunger 500 movable between a first position and a second position based on an applied electromagnetic field. The electromagnetic switches may also include connection terminals 505 and 510 to receive physical wire connections. For example, during normal operations, the plunger 500 is in a first, open position if no field is applied, and in a second, closed position upon application of a field. However, a sudden acceleration or deceleration (caused by a crash, for example) causes an inertial force that moves the plunger 500 to an undesired position to open or close the switch.

Figure 7:
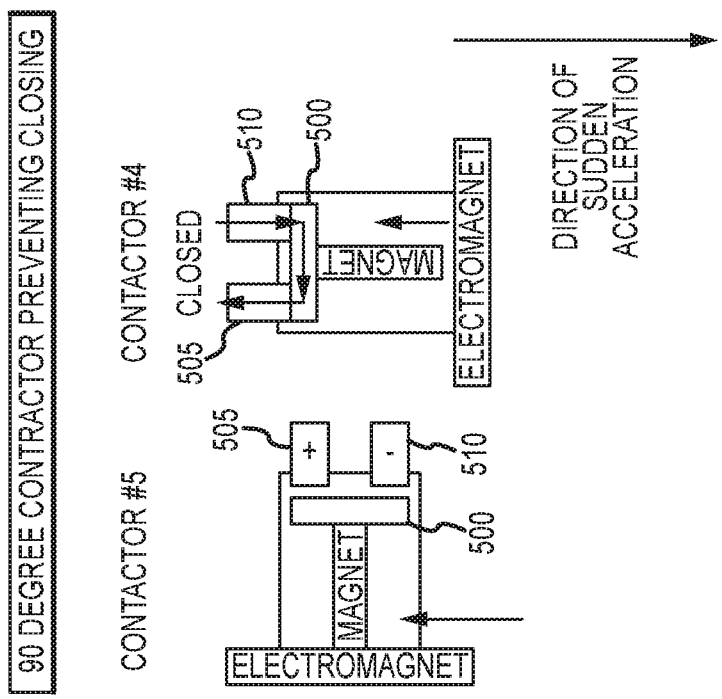
FIG. 7 illustrates an example arrangement of switches to mitigate or prevent an accidental short circuit in accordance with at least one example embodiment.
Figure 7:
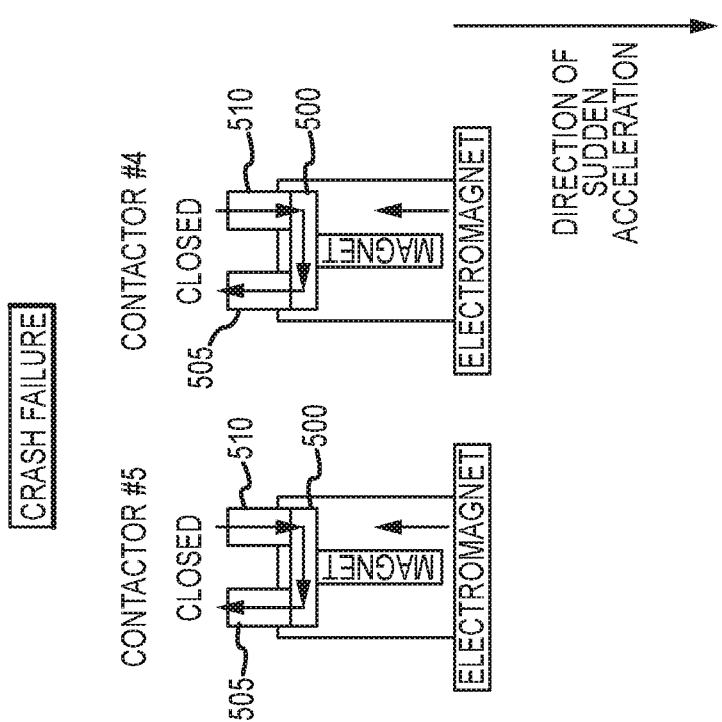

FIG. 7 illustrates an example arrangement of switches to mitigate or prevent an accidental short circuit. FIG. 7 illustrates an example of switch failure for contactors 4 and 5 caused by a sudden acceleration or deceleration. During the driving mode, contactor 4 is normally closed (see FIG. 3) and contactor 5 is normally open. However, the sudden acceleration or deceleration causes contactor 5 to also close, thereby shorting the batteries 205/210 together. However, the short circuit can be mitigated or prevented by arranging contactor 5 perpendicular to the contactor 4 in the junction box (see FIG. 10 for more detail).

Figure 8:
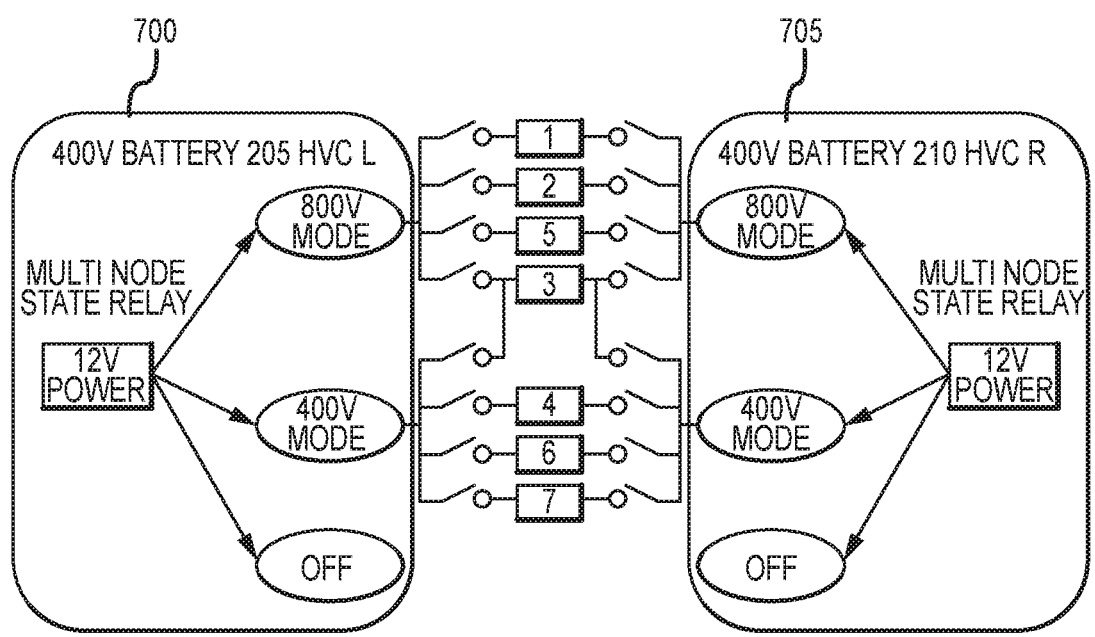
FIG. 8 illustrates an example structure of a controller in accordance with at least one example embodiment.

FIG. 8 illustrates an example structure of a controller for the systems of FIGS. 2-5. As discussed with reference to FIGS. 2-5, the systems 200/250 may be controlled by at least one controller (e.g., a high voltage controller (HVC)). According to at least one example embodiment, the at least one controller is a first controller (or HVC L) 700 and a second controller 705 (or HVC R). As shown in FIG. 8, the first controller 700 is associated with the first battery 205 and operable to individually select the plurality of switching elements 1 to 7. The second controller 705 is associated with the second battery 210 and operable to individually select the plurality of switching elements 1 to 7. The first controller 700 and the second controller 705 may be implemented by one or more processors or microprocessors executing instructions on a computer readable medium. Additionally or alternatively, the first and second controllers 700/705 may be implemented by hardware, such as an application specific integrated circuit (ASIC).

In the event of a failure of either the first controller 700 or the second controller 705, the other of the first controller 700 and the second controller 705 controls the plurality of switching elements 1 to 7. In order to do so, the first controller 700 includes a first multi-node relay coupled to the plurality of switching elements 1 to 7, and the second controller includes a second multi-node relay coupled to the plurality of switching elements 1 to 7. The first controller 700 and the second controller 705 individually select the plurality of switching elements through the first multi-node relay and the second multi-node relay, respectively. The first and second multi-node relays may be part of the auxiliary components 230 and powered by a 12V power supply. In FIG. 8, the 800V mode refers to the charging mode and the 400V mode refers to the driving mode.

It should be understood that one of controllers 700 and 705 may be omitted if desired.

Figure 9A:
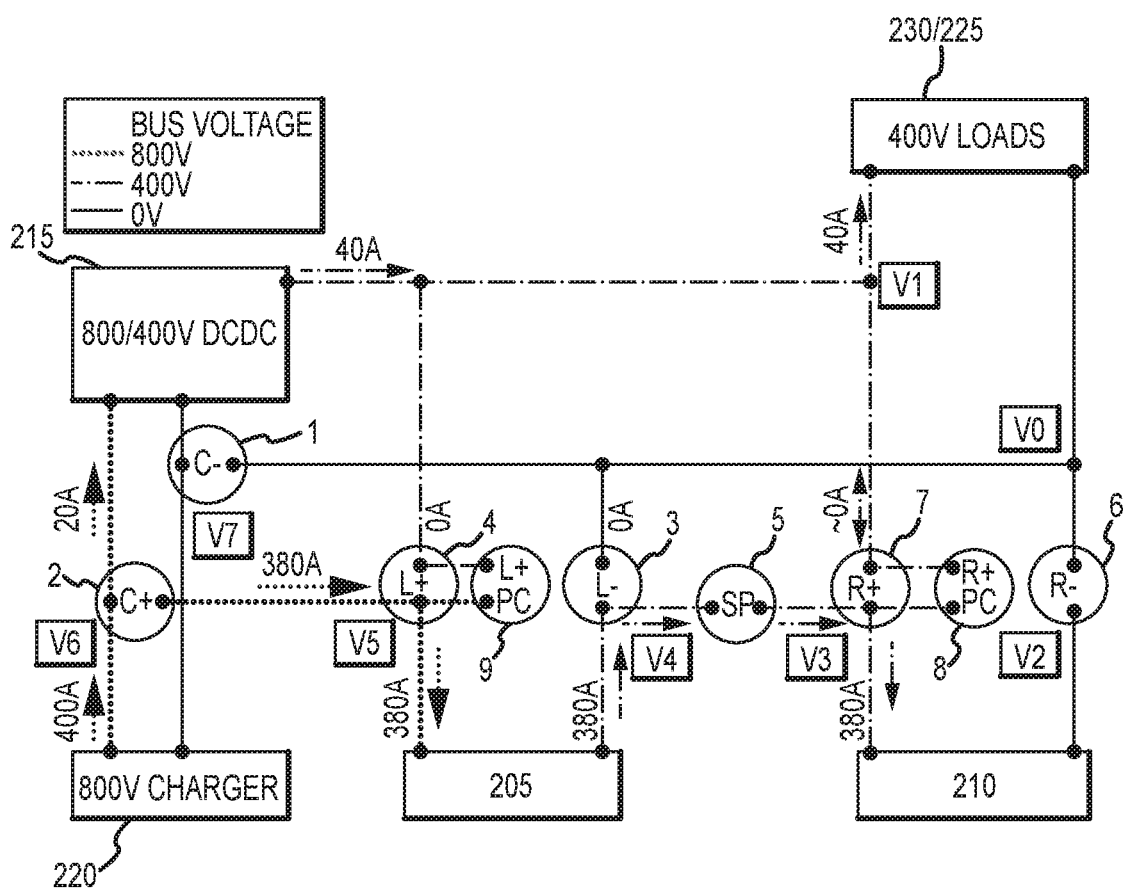
FIG. 9A illustrates another example schematic of a power system for the electrical vehicle in accordance with at least one example embodiment.

FIG. 9A illustrates another example schematic of a power system 800 for the electrical vehicle 100. FIGS. 9B and 9C illustrate control sequences for the schematic of FIG. 9A, for example, as controlled by controllers 700 and/or 705, for example.

The connections of the switches 1 to 7 and current values shown in FIG. 9A are for a charging mode of the electric vehicle 100. The elements of FIG. 9A are the same as or similar to the elements of FIG. 2 except that FIG. 9A includes additional precharge switching elements 8 and 9, which are used during a precharge operation of the electrical vehicle 100. FIG. 9A assumes a 350 A/800V external power source 220 and a 15 kW 800/400 DCDC voltage converter 215.

FIGS. 9B and 9C is a chart illustrating a start-up sequence for implementing a fast charging mode in the system 800 shown in FIG. 9A. FIGS. 9B and 9C include operations 1 to 19, where various operations may be omitted if desired (e.g., operations 3-10). In FIGS. 9A-9C, DCFC stands for DC fast charging, HVC L corresponds to controller 700, HVC R corresponds to controller 705, V1 to V7 are the voltages at various nodes in the system 800, VCU stands for vehicle control unit, and OBC stands for on-board controller.

FIG. 9D is a chart illustrating a shut-down sequence to exit the fast charging mode (e.g., to enter the driving mode).

FIG. 10 illustrates an example structure and arrangement of the plurality of switching elements within a junction box. As shown in FIG. 10, the junction box comprises a support substrate 900 that supports the plurality of switching elements 1 to 7. The support substrate 900 may be a printed circuit board (PCB) or other suitable substrate. As also shown, switching element 5 is arranged such that its plunger is perpendicular to the plunger of at least one of the other plurality of switching elements 1 to 7 on the support substrate 900. As discussed with reference to FIGS. 6 and 7, this arrangement may mitigate or alternatively prevent shorting the batteries 205/210 in the event of a crash. Although not explicitly shown, it should be understood that the plurality of switching element 1 to 7 are coupled to each other, the batteries 205/210, the voltage converter 215, the auxiliary components 230 and/or the powertrain 225 by respective bus lines.

Figure 11:
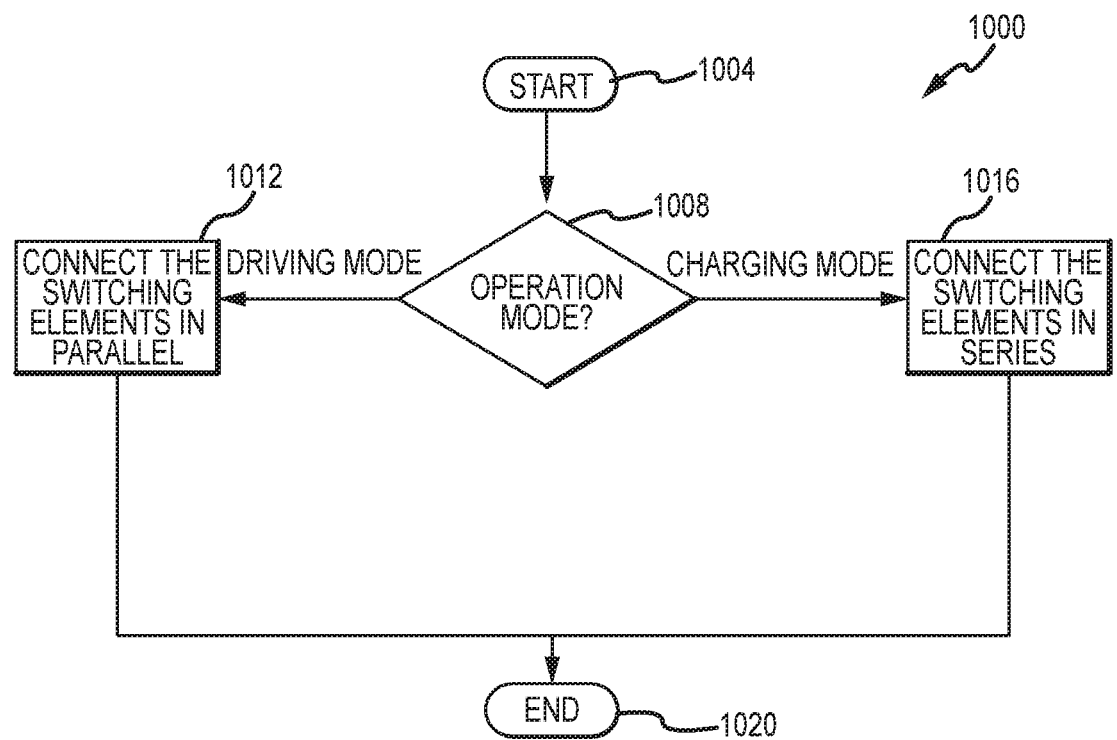
FIG. 11 is a flow diagram illustrating example operations of the system(s) in FIGS. 2-10 in accordance with at least one example embodiment.

FIG. 11 is a flow diagram illustrating example operations of the system(s) in FIGS. 2-10.

While a general order for the steps of the method 1000 is shown in FIG. 11, the method 1000 can include more or fewer steps or can arrange the order of the steps differently than those shown in FIG. 11. Generally, the method 1000 starts at operation 1004 and ends at operation 1020. The method can be executed as a set of computer-executable instructions executed by the controller(s) 700/705 and encoded or stored on a computer readable medium. Alternatively, the operations discussed with respect to FIG. 11 may be implemented by the various elements of the system(s) FIGS. 2-10. Hereinafter, the FIG. 11 shall be explained with reference to the systems, components, assemblies, devices, user interfaces, environments, software, etc. described in conjunction with FIGS. 1-10.

In operation 1008, the method 1000 determines an operation mode of the electric vehicle. If the operation mode is a driving mode in which the vehicle 100 is ready to be driven, the method 1000 controls the plurality of switching elements 1 to 7 that are coupled to the first battery 205 and the second battery 210 such that the first battery 205 and the second battery 210 are connected in series in operation 1012. If the operation mode is a charging mode in which the batteries 205/210 are desired to be charged, the method 1000 controls the plurality of switching elements 1 to 7 such that the first battery 205 and the second battery 210 are connected in parallel in operation 1016.

Although example embodiments have been discussed with reference to specific voltage/current values, it should be understood that example embodiments are not limited thereto. For example, example embodiments may also be applied to vehicle systems that charge/operate at different voltages/currents than those specifically referenced herein.

In view of the foregoing description, it should be appreciated that one or more example embodiments provide a power system(s) for an electric vehicle that has dual battery packs and a switch configuration that allows for fast charging. Example embodiments also provide safety mechanisms in the event of battery/controller failure as well as short circuit prevention. Further, example embodiments may reduce cost and footprint of the power system as well as the overall weight of the vehicle (e.g., by using fewer switching elements). One or more example embodiments also provide a flexible power architecture that can be altered by removing battery cells and/or adding more battery cells in series or parallel.

Embodiments include a junction box for an electric vehicle. The junction box includes a charging port to receive power from an external power source, and a plurality of switching elements to control electrical connections between the charging port, a first battery, and a second battery. On/off states of the plurality of switching elements control whether the charging port, the first battery and the second battery are connected in a first configuration or a second configuration.

Aspects of the junction box include that the first configuration is a configuration in which the first and second battery are connected in parallel during a driving mode, and the second configuration is a configuration in which the first and second battery are connected in series during a charging mode.

Aspects of the junction box include that the plurality of switching elements are electromagnetic switches that each include a plunger movable between a first position and a second position based on an applied electromagnetic field.

Aspects of the junction box include a support substrate that supports the plurality of switching elements. The plurality of switching elements includes a mode switching element coupled between the first battery and the second battery. The plunger of the mode switching element is arranged perpendicular to the plunger of at least one of the other plurality of switching elements on the support substrate.

Aspects of the junction box include that the plurality of switching elements comprise a first pair of electromagnetic switches coupled to the charging port, a second pair of electromagnetic switches coupled to the first battery, and a third pair of electromagnetic switches coupled to the second battery.

Aspects of the junction box include that the plunger of the mode switching element is arranged perpendicular to the plunger of at least one the electromagnetic switches in the second pair or the third pair.

Aspects of the junction box include that each of the first pair of electromagnetic switches, the second pair of electromagnetic switches, and the third pair of electromagnetic switches includes i) a first electromagnetic switch coupled to negative terminals of one or more of the charging port, the first battery, and the second battery, and ii) a second electromagnetic switch coupled to positive terminals of one or more of the charging port, the first battery, and the second battery.

Aspects of the junction box include that the first electromagnetic switch of each of the first pair, the second pair, and the third pair are coupled to one another, and wherein the second electromagnetic switch of each of the first pair, the second pair, the third pair are coupled to one another.

Aspects of the junction box include that the plurality of switching elements includes a mode switching element that includes a first terminal coupled to a positive terminal of the first battery, and a second terminal coupled to a negative terminal of the second battery. The mode switching element is ON during a charging mode and OFF during a driving mode.

Embodiments include a system for an electric vehicle. The system includes a voltage converter to convert a first voltage to a second voltage that is less than the first voltage, a first battery, and a second battery. The system includes a powertrain coupled to the voltage converter, the first battery, and the second battery and to power the electric vehicle with the second voltage, and a junction box. The junction box includes a charging port to receive the first voltage from an external power source, and a plurality of switching elements to control connections between the charging port, the first battery, and the second battery. The system includes at least one controller that controls switching of the plurality of switching elements to connect the first battery and the second battery in either a first configuration or a second configuration according to an operation mode.

Aspects of the system include that when the operation mode is a charging mode, the at least one controller controls the plurality of switching elements to connect the first battery and the second battery in the first configuration.

Aspects of the system include that when the operation mode is a driving mode, the at least one controller controls the plurality of switching elements to connect the first battery and the second battery in the second configuration.

Aspects of the system include that the first configuration is the first battery and the second battery being connected in series, and the second configuration is the first battery and the second battery being connected in parallel. A number of the plurality of switching elements is equal to seven or eight.

Aspects of the system include that the at least one controller is a first controller and a second controller. The first controller is associated with the first battery and operable to individually select the plurality of switching elements, and the second controller is associated with the second battery and operable to individually select the plurality of switching elements.

Aspects of the system include that in the event of a failure of either the first controller or the second controller, the other of the first controller and the second controller controls the plurality of switching elements.

Aspects of the system include that the first controller includes a first multi-node relay coupled to the plurality of switching elements, and wherein the second controller includes a second multi-node relay coupled to the plurality of switching elements. The first controller and the second controller individually select the plurality of switching elements through the first multi-node relay and the second multi-node relay, respectively.

Aspects of the system include that the plurality of switching elements includes a mode switching element that includes a first terminal coupled to a positive terminal of the first battery, and a second terminal coupled to a negative terminal of the second battery. The mode switching element is ON in the first configuration and OFF during in the second configuration.

Aspects of the system include that the plurality of switching elements are electromagnetic switches that each include a plunger movable between a first position and a second position based on an applied electromagnetic field.

Aspects of the system include a support substrate that supports the plurality of switching elements, wherein the plurality of switching elements includes a mode switching element coupled between the first battery and the second battery. The plunger of the mode switching element is arranged perpendicular to the plunger of at least one of the other plurality of switching elements on the support substrate.

Embodiments include a method of operating an electric vehicle. The method includes determining an operation mode of the electric vehicle, and controlling a plurality of switching elements that are coupled to a first battery and a second battery such that the first battery and the second battery are connected in series when the operation mode is a charging mode. The method includes controlling the plurality of switching elements such that the first battery and the second battery are connected in parallel when the operation mode is a driving mode.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A junction box for an electric vehicle, comprising:
   a charging port to receive power from an external power source; and
   a plurality of switching elements to control electrical connections between the charging port, a first battery, and a second battery, on/off states of the plurality of switching elements controlling whether the charging port, the first battery and the second battery are connected in a first configuration or a second configuration,
   wherein the first configuration is a configuration in which the first and second battery are connected in parallel during a driving mode in which the electric vehicle is being driven, and wherein the second configuration is a configuration in which the first and second battery are connected in series during a charging mode in which the first and second batteries are being charged.

2. The junction box of claim 1, wherein the first and second batteries are charged with 800V from the external power source during the charging mode.

3. The junction box of claim 1, wherein the plurality of switching elements are electromagnetic switches that each include a plunger movable between a first position and a second position based on an applied electromagnetic field.

4. The junction box of claim 3, further comprising:
a support substrate that supports the plurality of switching elements, wherein the plurality of switching elements includes a mode switching element coupled between the first battery and the second battery, and wherein the plunger of the mode switching element is arranged perpendicular to the plunger of at least one of the other plurality of switching elements on the support substrate.

5. The junction box of claim 4, wherein the plurality of switching elements includes:
 a first pair of electromagnetic switches coupled to the charging port;
 a second pair of electromagnetic switches coupled to the first battery; and
 a third pair of electromagnetic switches coupled to the second battery.

6. The junction box of claim 5, wherein the plunger of the mode switching element is arranged perpendicular to the plunger of at least one the electromagnetic switches in the second pair or the third pair.

7. The junction box of claim 5, wherein each of the first pair of electromagnetic switches, the second pair of electromagnetic switches, and the third pair of electromagnetic switches includes i) a first electromagnetic switch coupled to negative terminals of one or more of the charging port, the first battery, and the second battery, and ii) a second electromagnetic switch coupled to positive terminals of one or more of the charging port, the first battery, and the second battery.

8. The junction box of claim 7, wherein the first electromagnetic switch of each of the first pair, the second pair, and the third pair are coupled to one another, and wherein the second electromagnetic switch of each of the first pair, the second pair, the third pair are coupled to one another.

9. The junction box of claim 1, wherein the plurality of switching elements includes a mode switching element that includes a first terminal coupled to a positive terminal of the first battery, and a second terminal coupled to a negative terminal of the second battery, and wherein when the mode switching element is ON during the charging mode and OFF during the driving mode.

10. A system for an electric vehicle, comprising:
 a voltage converter to convert a first voltage to a second voltage that is less than the first voltage;
 a first battery;
 a second battery;
 a powertrain coupled to the voltage converter, the first battery, and the second battery and to power the electric vehicle with the second voltage;
 a junction box including:
  a charging port to receive the first voltage from an external power source; and
  a plurality of switching elements to control connections between the charging port, the first battery, and the second battery; and
 at least one controller that controls switching of the plurality of switching elements to connect the first battery and the second battery in either a first configuration or a second configuration according to an operation mode,
 wherein, when the operation mode is a charging mode in which the first and second batteries are charged, the at least one controller controls the plurality of switching elements to connect the first battery and the second battery in series, and
 wherein, when the operation mode is a driving mode in which the electric vehicle is driven, the at least one controller controls the plurality of switching elements to connect the first battery and the second battery in parallel.

11. The system of claim 10, wherein the first and second batteries are charged with 800V during the charging mode.

12. The system of claim 11, wherein the powertrain has an operating voltage of 400V.

13. The system of claim 10, wherein a number of the plurality of switching elements is equal to seven or eight.

14. The system of claim 10, wherein the at least one controller is a first controller and a second controller, wherein the first controller is associated with the first battery and operable to individually select the plurality of switching elements, and wherein the second controller is associated with the second battery and operable to individually select the plurality of switching elements.

15. The system of claim 14, wherein, in the event of a failure of either the first controller or the second controller, the other of the first controller and the second controller controls the plurality of switching elements.

16. The system of claim 15, wherein the first controller includes a first multi-node relay coupled to the plurality of switching elements, and wherein the second controller includes a second multi-node relay coupled to the plurality of switching elements, wherein the first controller and the second controller individually select the plurality of switching elements through the first multi-node relay and the second multi-node relay, respectively.

17. The system of claim 10, wherein the plurality of switching elements includes a mode switching element that includes a first terminal coupled to a positive terminal of the first battery, and a second terminal coupled to a negative terminal of the second battery, and wherein when the mode switching element is ON in the first configuration and OFF during in the second configuration.

18. The system of claim 10, wherein the plurality of switching elements are electromagnetic switches that each include a plunger movable between a first position and a second position based on an applied electromagnetic field.

19. The system of claim 18, further comprising:
 a support substrate that supports the plurality of switching elements, wherein the plurality of switching elements includes a mode switching element coupled between the first battery and the second battery, and wherein the plunger of the mode switching element is arranged perpendicular to the plunger of at least one of the other plurality of switching elements on the support substrate.

20. A method of operating an electric vehicle, comprising:
 determining an operation mode of the electric vehicle;
 controlling a plurality of switching elements that are coupled to a first battery and a second battery such that the first battery and the second battery are connected in series when the operation mode is a charging mode in which the first and second batteries are charged; and
 controlling the plurality of switching elements such that the first battery and the second battery are connected in parallel when the operation mode is a driving mode in which the electric vehicle is driven.

* * * * *